United States Patent
Bala et al.

(10) Patent No.: US 8,085,434 B2
(45) Date of Patent: Dec. 27, 2011

(54) PRINTER CHARACTERIZATION FOR UV ENCRYPTION APPLICATIONS

(75) Inventors: Raja Bala, Webster, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 609 days.

(21) Appl. No.: 12/052,909

(22) Filed: Mar. 21, 2008

(65) Prior Publication Data

US 2009/0237682 A1  Sep. 24, 2009

(51) Int. Cl.
*G06F 15/00* (2006.01)
*B42D 12/02* (2006.01)

(52) U.S. Cl. .......... 358/1.9; 358/3.28; 358/3.2; 358/2.1; 358/1.18; 358/3.09; 358/3.1; 358/3.11; 358/3.12; 358/510; 358/512; 358/516; 358/518; 358/520; 358/534; 358/536; 382/100; 382/165; 382/167; 283/85; 283/92; 283/113; 283/114; 356/927; 356/928; 356/955; 430/254; 430/263; 430/269; 430/270.1; 430/290; 430/302; 430/276.1; 430/495.1; 430/512; 359/350; 359/361; 359/389; 359/407; 359/433; 359/505

(58) Field of Classification Search .......... 358/1.9, 358/3.28, 2.1, 512, 515, 516, 518, 520; 430/254, 430/263, 269, 270.1, 290, 302, 276, 512; 347/6, 100, 175; 359/350, 361, 389, 433, 359/505
See application file for complete search history.

(56) References Cited

U.S. PATENT DOCUMENTS

| | | | |
|---|---|---|---|
| 6,743,283 B2 * | 6/2004 | Imanishi et al. | 106/31.14 |
| 6,816,168 B2 * | 11/2004 | Kumada et al. | 345/589 |
| 7,515,822 B2 * | 4/2009 | Keam | 396/159 |
| 2007/0139681 A1 | 6/2007 | Eschbach et al. | |
| 2007/0229870 A1 * | 10/2007 | Doi et al. | 358/1.9 |
| 2007/0264476 A1 | 11/2007 | Bala et al. | |
| 2008/0180040 A1 * | 7/2008 | Prendergast et al. | 315/297 |
| 2008/0204771 A1 * | 8/2008 | Albat et al. | 358/1.9 |
| 2008/0299333 A1 * | 12/2008 | Bala et al. | 428/29 |
| 2008/0315574 A1 * | 12/2008 | Emerich et al. | 283/91 |
| 2009/0097028 A1 * | 4/2009 | Vogh, Jr. | 356/407 |

FOREIGN PATENT DOCUMENTS

JP   011090170   * 7/1989

* cited by examiner

*Primary Examiner* — Steven Kau

(74) *Attorney, Agent, or Firm* — Fay Sharpe LLP

(57) ABSTRACT

The appearance of a color print viewed under UV illumination is predicted using a target comprising color patches each printed using a known coverage of printer colorant(s). In one case, the target is illuminated using a UV light source and an electronic image of the target is captured using a digital camera or the like. In another case, a spectrophotometer is used both with and without a UV cutoff filter to measure the target. The captured image data or the spectrophotometric measurements are used to derive a UV printer characterization model that relates any arbitrary combination of printer colorants to a predicted UV color appearance value. Metameric colorant mixture pairs for visible light and UV light viewing can be determined using the UV model together with a conventional visible light printer characterization model. A visual matching task is used to determine a correction factor for the UV printer characterization model.

11 Claims, 5 Drawing Sheets

PRINTER CHARACTERIZATION FOR UV ENCRYPTION APPLICATIONS

BACKGROUND

Security is an important concern in the realm of documents and digital production and/or reproduction of documents. Known digital image printing/copying systems produce documents of such high quality that a need has been identified to prevent effective printing/copying of certain documents such as high-value printed items including tickets, financial instruments, security passes, and the like. Known techniques include printing the original document in a manner such that it includes a digital "watermark" using only conventional paper and toner or ink. A digital watermark is defined as information, for example one or more letters, words, symbols or patterns, that is at least partially (preferably fully or at least substantially) hidden in a printed image under normal viewing conditions but that is more clearly discernable under certain specialized viewing conditions. Unauthorized reproduction of documents including such digital watermarks typical degrades or obscures the digital watermark, which can aid in detection of counterfeit documents.

A fluorescence mark is one example of a known digital watermark. Methods and systems are known for including fluorescence marks in printed documents using conventional papers (e.g., ordinary "copy paper" or "printer paper") and ordinary inks/toners (e.g., CMYK ink/toner), specifically by using metameric colorant mixtures. Under visible lighting conditions (e.g., electromagnetic radiation wavelengths of about 400-700 nanometers (nm), the different colorant mixtures that are printed on respective adjacent portions of the paper together define an overall printed document region that appears substantially uniform in color. Under ultraviolet (UV) lighting (e.g., electromagnetic radiation wavelengths shorter than about 400 nm), these different colorant mixtures exhibit different UV absorption and, thus, different suppression of UV fluorescence of the optical brightening agents used in conventional printing/copying papers such that the region printed with the colorant mixture that suppresses less of the substrate fluorescence appears as a lighter/brighter region while the adjacent area printed with the colorant mixture that strongly suppresses substrate fluorescence appears as a darker region. These contrast variations under UV lighting are used to create watermark patterns, e.g., numbers, letters, symbols, shapes.

An example of this is shown in FIG. 1, wherein a colorant mixture "B" is selected and applied to patch area BP which, in this example, is shaped as the alphanumeric symbol "0". Further, a colorant mixture "A" is selected and applied to patch area AP arranged in substantially close spatial proximity to patch area BP, and thereby providing a background around patch area BP. Both colorant mixture A and colorant mixture B are comprised of a suitably selected colorant or colorant mixtures, but colorant mixtures A and B are different mixtures. Each colorant mixture A or B may be, for example, either a single CMYK colorant or any mixture of CMYK colorants. In the illustrated example, colorant mixture A will be selected so as to provide higher UV absorption (greater substrate fluorescence suppression) than that selected for colorant mixture B. The colorant mixtures A and B will also be selected to match each other closely in their average color and luminance when viewed under visible light conditions. As shown at UV in FIG. 1, under UV lighting conditions, patch BP will appear brighter as compared to patch AP, due to the relatively limited suppression of the fluorescence of the optical brightening agents in the paper substrate as compared to the patch AP, thus forming a watermark W1. In contrast, under visible light conditions as shown at VIS, patches AP,BP are at least substantially indistinguishable. By way of example, an approximate 50% grayscale gray colorant mixture may be realized with a halftone of black (K) colorant only and used for colorant mixture B to print patch BP. This may then be color-matched against a colorant mixture comprising a high amount of yellow (Y) mixed with enough cyan (C) and magenta (M) to yield a similar approximate 50% grayscale gray colorant mixture A which is used to print the patch AP. With the given high content of yellow colorant in colorant mixture A, this colorant mixture will provide much higher absorption of UV or suppression of native substrate fluorescence as compared to the patch BP, so that under UV lighting conditions, the patch BP will be readily apparent as a watermark W1. The two colorant mixtures will appear quite nearly identical "gray" under normal visible light viewing as shown at VIS in FIG. 1. Thus, when a document including such a fluorescence mark is subjected to UV illumination, the watermark W1 is revealed. A printed "look-alike" document or mere photocopy will not include the watermark. Additional details and variations relating to fluorescence marks are disclosed in U.S. patent application Ser. No. 11/382,897 filed May 11, 2006 in the name of Raja Bala and Reiner Eschbach and entitled "Substrate Fluorescence Mask for Embedding Information in Printed Documents" and U.S. patent application Ser. No. 11/382,869 filed May 11, 2006 in the name of Raja Bala and Reiner Eschbach and entitled "Substrate Fluorescence Pattern Mask for Embedding Information in Printed Documents" and the disclosures of both these applications are hereby expressly incorporated by reference into the present specification.

It will be appreciated from the above that a key to successful implementation of fluorescence marks is the ability to find the metameric colorant mixture pairs "A" and "B" that exhibit minimal color difference in visible light and high contrast in UV light. Furthermore, it has been deemed highly desirable to automate the process of identifying these metameric colorant mixture pairs. A critical step toward automating the metameric colorant mixture pair identification process is deriving a model that will predict the appearance (color) of color prints in UV light, that can be used together with known models that predict the appearance (luminance) of color prints in visible light to find metameric matches.

One method for deriving a UV printer characterization model involves printing a color target such as cyan C, magenta M, yellow Y, and black K (CMYK) ramps (i.e., bands of increasing or decreasing ink coverage from zero to full coverage) and the 16 possible CMYK solid colorant mixtures or "overprints", and using a spectroradiometer to make direct radiometric measurements of the target under UV illumination. The radiometric measurements are then used to derive colorimetric tristimulus values for the components of the color target, from which a printer characterization model is derived that establishes a relationship between other, non-solid intermediate colorant coverage amounts and colorimetric coordinates. While this method produces an accurate UV characterization of a printer, it is expensive, time-consuming, and laborious.

Accordingly, a need has been identified for a UV printer characterization method that overcomes the above and other drawbacks of the direct radiometric method while providing satisfactory results.

SUMMARY

In accordance with one aspect of the present development, a method for predicting the appearance of a color print viewed under UV illumination includes printing a multi-colorant target comprising a plurality of color patches each printed using a known coverage of one or more of a plurality of printer colorants. The target is illuminated using a UV light source, and an electronic image of the multi-colorant target is captured while the target is illuminated with the UV light source. The electronic image comprises a plurality of color signals acquired for each color patch of said multi-colorant target. From the plurality of color signals for each color patch, a prediction of color appearance value under UV light for that color patch is computed. From the prediction of color appearance values for each color patch, a UV printer characterization model is derived that relates any arbitrary combination of the printer colorants to a predicted UV color appearance value. The predicted UV color appearance value for the combination of printer colorants indicates a relative color appearance resulting from printing a document using such combination of printer colorants and viewing the document while the document is illuminated with a UV light source.

In accordance with another aspect of the present development, a method for predicting the appearance of a color print viewed under UV illumination includes printing a multi-colorant target comprising a plurality of color patches each printed using a known coverage of one or more of a plurality of printer colorants. A spectrophotometer is used without a UV cutoff filter to obtain a first spectral reflectance distribution for each color patch of the multi-colorant target. A spectrophotometer is used with a UV cutoff filter to obtain a second spectral reflectance distribution for each color patch of the multi-colorant target. The first and second spectral reflectance distributions are used to derive a prediction of the spectral radiance distribution under UV light for each color patch of the multi-colorant target. The predicted spectral radiance distribution of each color patch is used to calculate predicted color appearance values for that color patch under UV light. From the prediction of color appearance values for each color patch, a UV printer characterization model is derived that relates any arbitrary combination of the printer colorants to a predicted UV color appearance value. The predicted UV color appearance value for the combination of printer colorants indicates a relative color appearance resulting from printing a document using such combination of printer colorants and viewing the document while the document is illuminated with a UV light source.

In accordance with another aspect of the present development, a method for selecting colorant mixture pairs that are suitable for use in printing a fluorescence mark in a printed document includes inputting a first colorant mixture definition to both: (i) a normal light model that predicts a first color, under normal light, of a first document region printed with a first colorant mixture defined according to the first colorant mixture definition; and, (ii) a UV light model that predicts a first luminance, under UV light, of the first document region. The method further includes inputting a second colorant mixture definition to both: (i) the normal light model that predicts a second color, under normal light, of a second document region printed with a second colorant mixture defined according to the second colorant mixture definition; and, (ii) the UV light model that predicts a second luminance, under UV light, of the second document region. The method further includes identifying the first and second colorant mixtures as suitable for use in printing a fluorescence mark in a printed document if the first and second colors under normal light are at least substantially similar, and the first and second luminances under UV light are visibly different.

DETAILED DESCRIPTION

Figure 1:
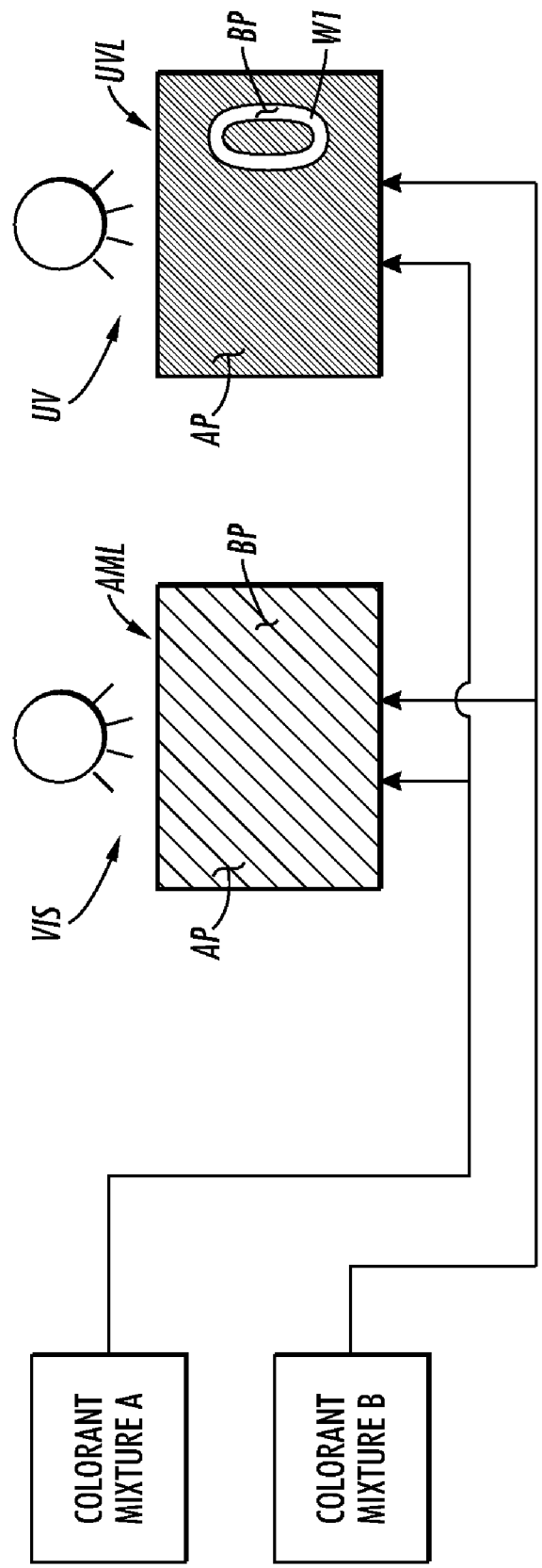
FIG. 1 (prior art) diagrammatically discloses the inclusion of a fluorescence mark in a printed document using a metameric colorant mixture pair.
Figure 2:
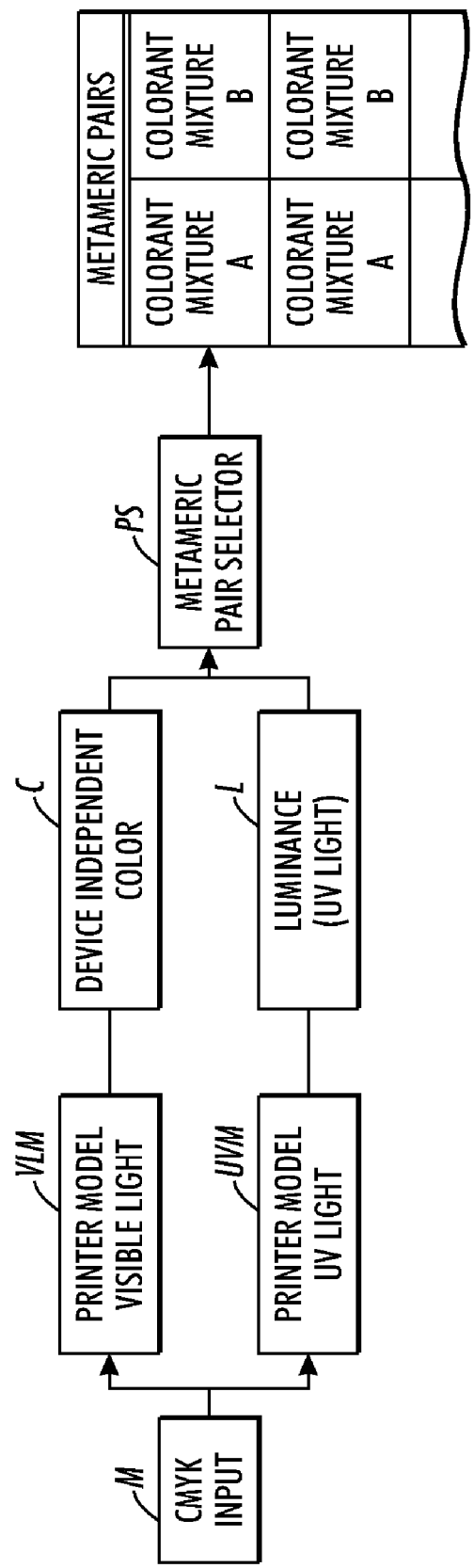
FIG. 2 discloses use of a conventional visible light printer characterization model and an ultraviolet (UV) printer characterization model in accordance with the present development to identify metameric colorant mixture pairs suitable for use in printing fluorescence marks.

FIG. 2 discloses use of a conventional, visible light printer characterization model VLM and use of a UV printer characterization model UVM in accordance with the present development to identify metameric colorant mixture pairs relative to visible and UV light viewing of a printed document. In particular, for a plurality of colorant mixtures M, each defined by gray level digital inputs for a plurality of colorants, e.g., three or more of cyan, magenta, yellow, or black colorants as shown in FIG. 2, the visible light printer characterization model VLM derives the expected color C that will be perceived by a human observer when a document printed with a colorant mixture M is viewed in visible light (e.g., D50 illuminant or D65 illuminant). This visible light printer characterization model VLM outputs a device-independent or "colorimetric" description of the expected color C resulting from printing using the colorant mixture M, e.g., using a color space such as CIELAB or CIEXYZ.

Correspondingly, for each input colorant mixture M, the UV light printer characterization model UVM derives an expected appearance or color perceived by a human observer during UV light viewing of a document printed with the colorant mixture M. In particular, the UV printer characterization model UVM outputs the expected luminance value L. The color C and luminance L for a plurality of colorant mixtures M are input to a metameric pair selector PS that identifies metameric colorant mixture pairs A,B that have the same or at least substantially similar visible light color C but different UV light appearance (luminance L) as required for printing fluorescence marks. The luminance value L output by the UV printer characterization model UVM can be considered as a "luminance ordering" given that the important information is not the actual luminance but, instead, the relative luminance of a colorant mixture in UV light as compared to another colorant mixture.

Visible light printer characterization models VLM are known. In general, the printer being characterized is used to print a plurality of test patches using known colorant (e.g., CMYK) input values representative of the range of possible colorant input values. The color of each test patch is measured, and the measured colors for these test patches are used to derive a color for all other possible printer colorant combinations so as to define the visible light printer characterization model that outputs an expected color for each possible combination of the printer colorants.

The visible light printer characterization models VLM, the UV light printer characterization models UVM, the metameric pair selector PS, and the other image processing operations disclosed herein are preferably implemented using a special purpose or general purpose computer such as a "personal computer" or workstation comprising hardware and/or software for performing the operations described. The computer for performing the image processing operations can be provided as part of a printing system such as known digital front end (DFE) hardware and software systems. Examples of printers that can be characterized for UV encryption applications as described herein include any known digital color printing device such as known xerographic or ink-jet printers including, e.g., Phaser™, WorkCentre™, DocuColor™, and iGen3™ printing systems available commercially from Xerox Corporation.

The UV light printer characterization model UVM is described below. In general, the printer being characterized is used to print a plurality of color patches using known colorant (e.g., CMYK) input values representative of the range of possible colorant input values. The luminance of the test color patches is determined and the luminance for other colorant coverages is derived (as described below) to define the UV light printer characterization model UVM that outputs an expected luminance for any possible combination of the printer colorants, at least relative to the luminance of another combination of printer colorants.

Figure 3:
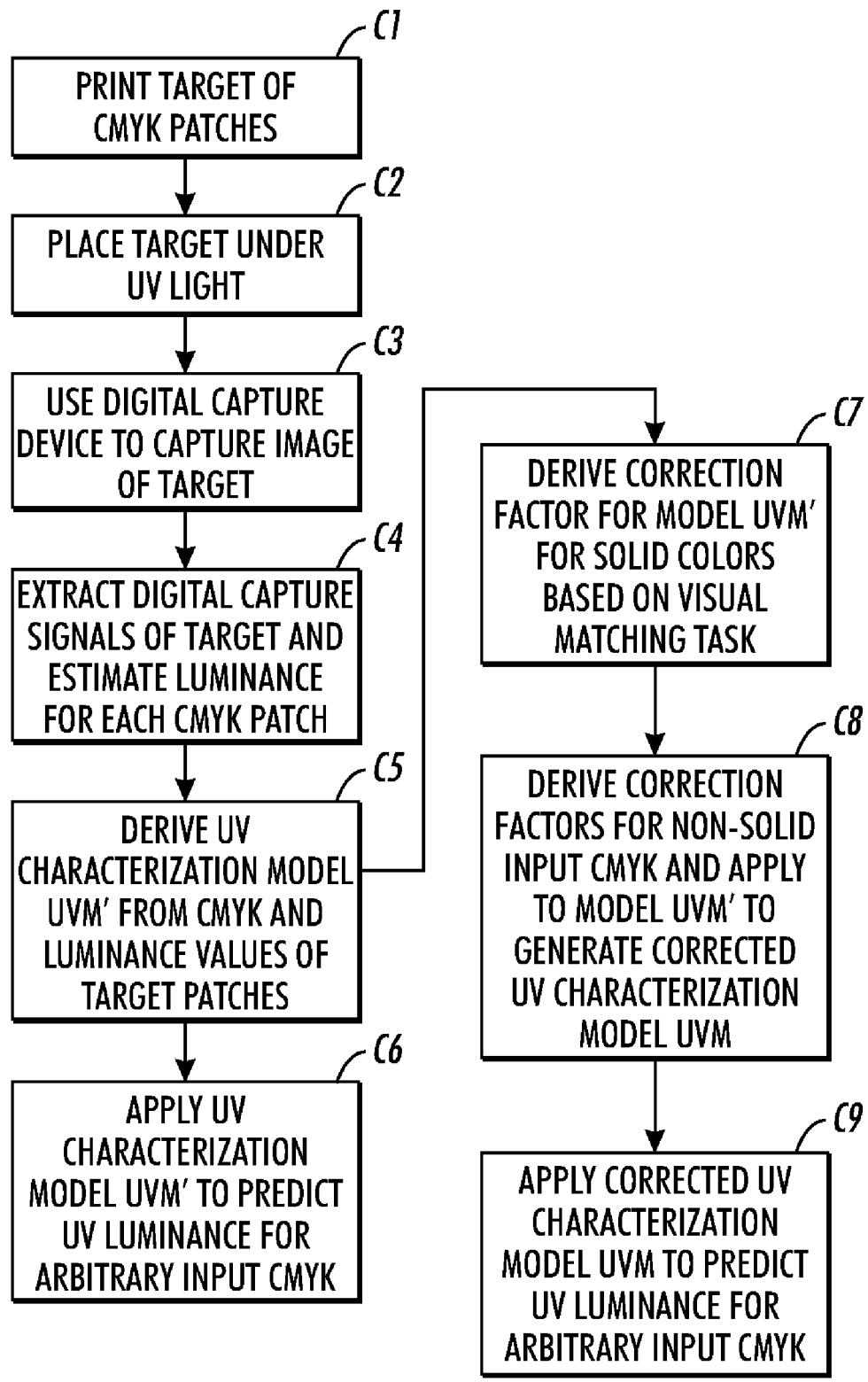
FIG. 3 discloses an embodiment of the present development in which a digital camera is used to develop a UV printer characterization model.

In one embodiment, as shown in FIG. 3, the UV light printer characterization model UVM is developed using a digital camera as a color measurement device, and luminance values are then derived from red, green and blue (RGB) color signals output by the camera. More particularly, in a step C1, a multi-colorant target comprising a plurality of different color patches is printed using the printer that is to be characterized. Each color patch defined by its CMYK input values (note that, the input value for one or more of the CMYK colorants of each color patch can be zero such as when, for example, the color patch is defined using only 1, 2, or 3 of the CYMK printer colorants, e.g., a CMY color patch is defined when K=0; or a pure cyan (C) color patch is defined when M=0, Y=0 and K=0). The target comprises sufficient different color patches that span the range of all possible CMYK colors. In one example, the target comprises an ramp of each colorant (i.e., a band of increasing or decreasing coverage using each CMYK colorant), and enough combinations of the colorants to cover the range of 0% -100% coverage for each colorant, e.g., all possible combinations of 3 or 4 coverage levels for each of the colorants.

In a step C2, the multi-colorant CMYK target is placed in UV light.

In a step C3, a digital capture device such as a digital camera is used to capture an electronic image of the multi-colorant CMYK target while it is illuminated by UV light. The electronic image captured by the camera includes red, green, and blue (RGB) channel signals for each color patch of the target. Although the green channel signal is known to correspond most closely to luminance, the green channel signal exhibits a very small dynamic range (about 0 to 20) with respect to UV illumination, and such a small dynamic range renders it unsuitable as a proxy for UV luminance due to the possibility for noise to greatly distort the results. The blue channel signal, however, exhibits a larger dynamic range (about 0 to 255) in UV conditions and is, thus, most robust to noise. According to the present development, the blue channel signal is used as a predictor of UV luminance.

As such, in a step C4, the digital capture signals of the target are extracted and used to estimate a luminance for each CMYK patch of the target. In one embodiment, the blue channel signal output by the camera or other image capture device is extracted for each color patch of the target as illuminated by UV light in order to estimate the luminance for each CMYK patch of the target. In such case, the data from step C4 will include a blue channel signal value for all levels of colorant coverage for each of the CMYK colorants (taken from the CMYK ramps of the target) and also will include a blue channel signal values for the particular combinations of colorants used to print the other color patches on the CMYK target.

In a step C5, an uncorrected UV printer characterization model UVM' is derived from the CMYK and luminance values of the patches of the CMYK target. For example, the blue channel signal values for the color patches of the multi-colorant CMYK target are interpolated to provide a blue channel signal value for all possible combinations of the CMYK colorants. The interpolated blue channel signal thus defines the uncorrected UV printer characterization model UVM'.

Although not optimal, in a step C6, the uncorrected UV printer characterization model UVM' is used directly, "as-is," as a predictor of UV luminance (ordering) for all possible arbitrary CMYK colorant combinations.

More preferably, as described in detail below, a step C7 is performed to derive a correction factor for solid colors in uncorrected model UVM' based on a visual matching task. In a step C8, correction factors for non-solid CMYK inputs are derived, and the correction factors are applied to the uncorrected UV printer characterization model UVM' to define the (corrected) UV printer characterization model UVM.

Then, in a step C9, the corrected UV printer characterization model UVM is applied to predict the luminance L for the arbitrary CMYK colorant mixtures M input to the model. Using the visual matching task, as described below, a correction factor (error value) for the blue channel signal as it relates to solid (100% colorant coverage) single color patches is determined for each single, non-black colorant and all two-colorant solid overprints of the non-black colorants (e.g., red, green and blue (RGB) solid overprints for cyan, magenta, and yellow (CMY) colorants). These correction factors are used to adjust the blue channel signal values for the visually-matched solid single and two-colorant color patches and all intermediate levels and combinations of colorant coverages to provide the corrected blue channel signal that defines the UV printer characterization model.

The visual matching task is described with reference to FIGS. 4A and 4B. It is assumed that the uncorrected blue channel camera signal is an accurate predictor for luminance of pure black (K) colorant patches under UV illumination for all digital coverage levels between 0% and 100% colorant coverage (e.g., digital 0 to 255 for an 8 bit depth system). It is also assumed that that there is a tone reproduction curve (TRC) that maps each digital black level to luminance L for UV illumination (keeping in mind that luminance ordering rather than actual luminance is important for security applications).

Figure 4A:
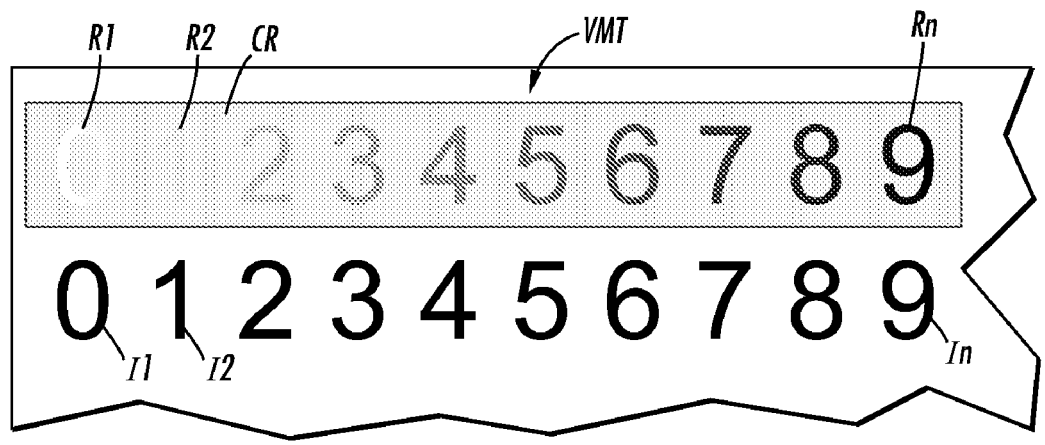
FIG. 4A partially illustrates a visible matching target used to adjust or correct the UV printer characterization model.

With reference to FIG. 4A, a visible matching target VMT is partially shown and includes a color region CR printed using the printer being characterized. Black regions R1, R2, . . ., Rn of respective digital black levels K1, K2, . . . Kn (preferably arranged in increasing or decreasing order) are printed on or adjacent the color region CR. In the illustrated example, the black regions R1, . . . ,Rn are defined as successive numerals, but other shapes, letters, etc. can be used. Also, respective unique identifiers I1, I2, . . . , In are printed adjacent and are associated with each black region R1, . . . ,Rn to facilitate user identification of each black region R1, . . . ,Rn (as shown, the identifiers are numerals that respectively match the numerals used for the regions R1, . . . ,Rn). FIG. 4A shows the appearance of the color region CP in visible light. The complete visual matching target VMT includes a solid (100% coverage) color region CR for each non-black colorant (CMY) and also a solid color patch for each possible overprint color (i.e., red (R), green (G), and blue (B)), along with the digital black regions R1, . . . Rn and the identifiers I1, . . . In for each color patch.

Figure 4B:
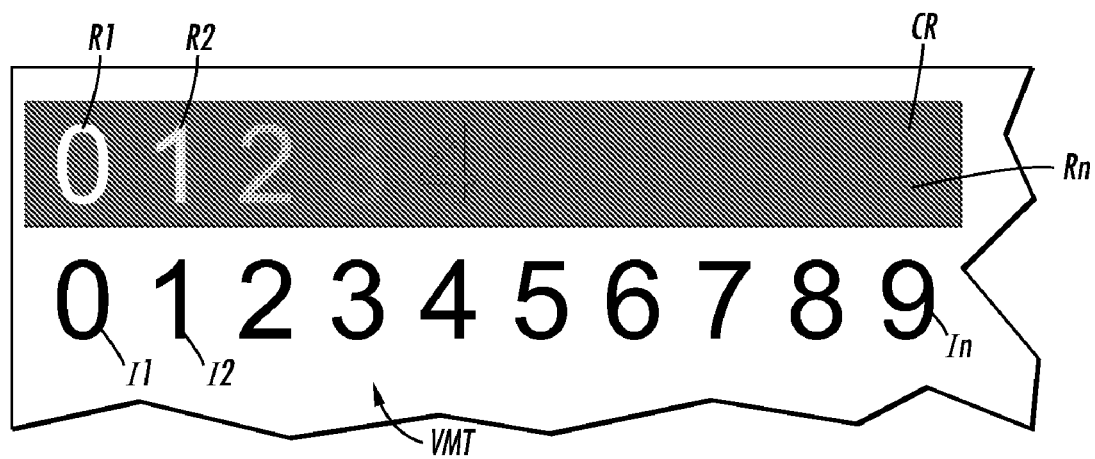
FIG. 4B shows the visible matching target of FIG. 4A as it appears when viewed in UV light.

As shown in FIG. 4B, when the visual matching target VMT is subjected to UV light, each color region CR exhibits a certain luminance that can be determined by asking a human observer to select the digital black region R1, . . . ,Rn that most closely matches the UV luminance of the color region CR. In the illustrated example, the user is requested to select the highest numeral (darkest numeral) that can still be discerned relative to the background color region CR, i.e., the black region R1, . . . ,Rn that is most difficult to distinguish or that most closely matches the appearance of the color region CR). Those of ordinary skill in the art will recognize the need for the identifiers I1, . . . ,In which allow the observer to more easily identify the regions R1, . . . ,Rn that can or cannot be seen in UV light. In FIG. 4B, the user would select "4" as this is region R1 . . . ,Rn that most closely matches the appearance of the background color region CR under UV illumination. This, then, equates the UV luminance of the color region CR to a particular black colorant coverage level K1, . . . , Kn. As such, taking these observations for each color patch CP of the visual matching target VMT, the relative luminance or "luminance ordering" of all color patches of the visual matching target is known.

From the digital camera CMYK target data acquired in steps C1-C4, we know the raw or uncorrected blue channel signal value (luminance) for 100% colorant coverage for each CMYK colorant ramp (including black) and the RGB overprints. As noted, it is assumed that the uncorrected blue channel signal is an accurate predictor for UV luminance of pure black (K) colorant patches under UV illumination for all black colorant digital coverage levels K1, . . . , Kn between 0% and 100% colorant coverage. Finally, from the visual matching task just described in connection with FIGS. 4A and 4B, we also know a level of black colorant coverage K1, . . . , Kn that corresponds to the actual, human observed luminance for of each solid CMY colorant region and the solid RGB overprints of same. As such, a correction factor CF for each solid colorant region CR of the visual matching target (i.e., the solid CMY colorant regions and the solid RGB overprint regions) can be determined as follows:

$$CF = B_K/B \quad \text{(Eq. 1)}$$

where $B_K$ is the camera blue channel signal level corresponding to the digital black level K1, . . . , Kn of the black region R1, . . . , Rn selected by a user in the visual matching task, and B is the uncorrected camera blue channel data for relevant colorant or overprint at 100% coverage. Note that both $B_K$ and B are obtained from steps C1-C4 of FIG. 3. Once the correction factor CF is determined for the CMY and RGB 100% coverages, the correction factor for an arbitrary colorant coverage combination can be derived by interpolation, e.g., using the Neugebauer model or the like. This correction factor is then multiplied by the luminance originally predicted by the UV printer characterization model, to produce a corrected prediction of UV luminance for that colorant coverage combination. As described above in connection with FIG. 3, step C7, the corrected blue channel signal is used as the UV printer characterization model UVM to provide the luminance L for the various colorant mixtures M input to the model.

Figure 5:
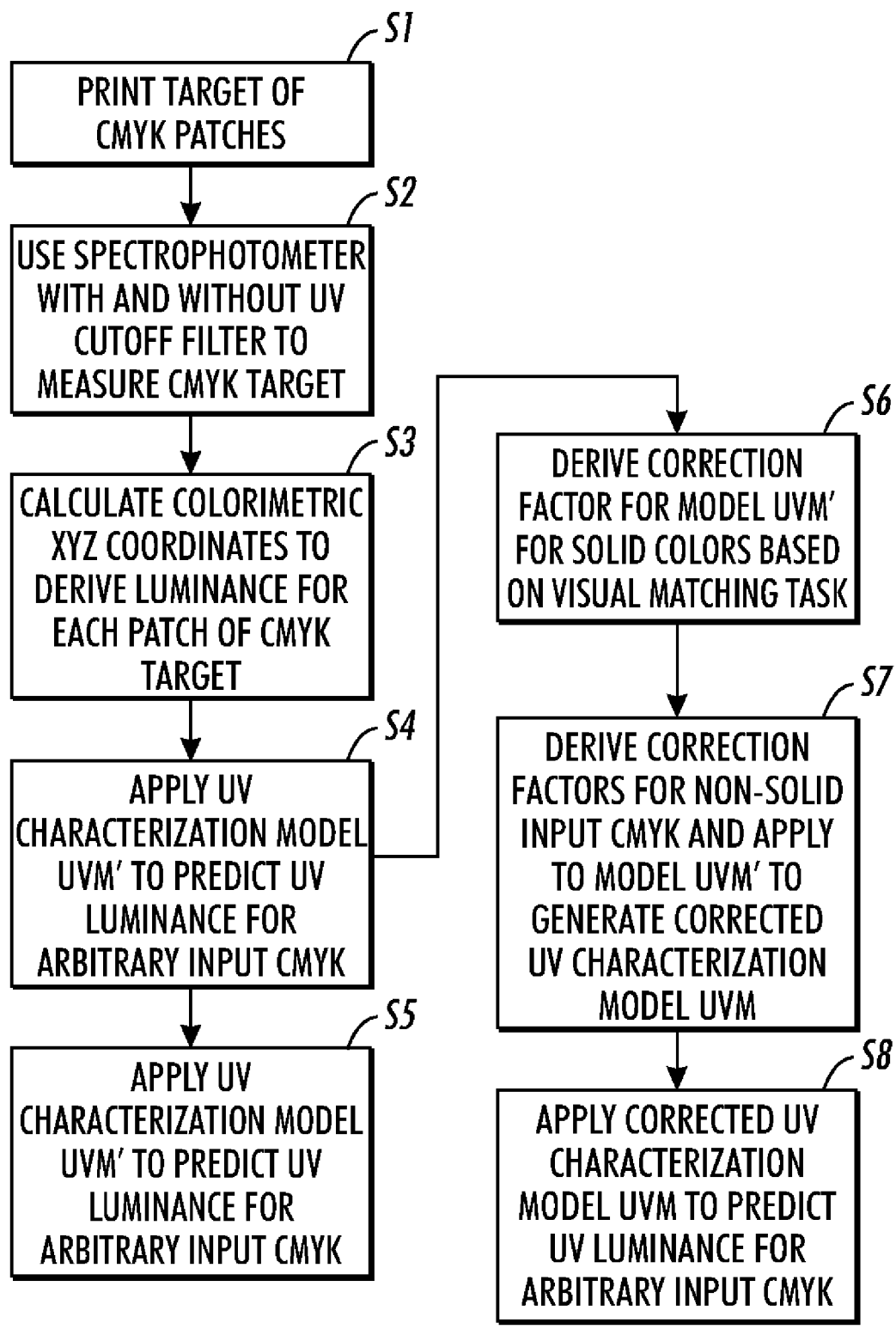
FIG. 5 discloses another embodiment of the present development in which a spectrophotometer is used to develop a UV printer characterization model.

FIG. 5 discloses an alternative embodiment for developing the UV light printer characterization model UVM, in which the use of a digital camera is replaced by use of a spectrophotometer as a color measurement device. As is generally known in the art, a spectrophotometer is a photometer that measures the intensity of light as a function of wavelength. In particular, the spectrophotometer provides output data that describe the light reflected from a specimen (or transmitted though a specimen) in terms of the intensity of each wavelength component thereof. The spectrophotometer used includes a light source, often of unknown properties, but known to include both visible and UV wavelengths. The spectrophotometer used in the present development also includes a UV cutoff filter that can be selectively used to filter the UV wavelengths from the light source before the light from the light source is incident on the specimen being analyzed.

In a step S1, a multi-colorant target comprising a plurality of different color patches is printed using the printer that is to be characterized. Each color patch is defined by its CMYK input values (as explained above, the input value for one or more of the CMYK colorants of each color patch can be zero such as when, for example, the color patch is defined using only 1, 2, or 3 of the CYMK printer colorants). The multi-colorant target comprises sufficient different color patches that span the range of all possible CMYK colors. In one example, the target comprises an ramp of each colorant (i.e., a band of increasing or decreasing coverage using each CMYK colorant), and enough combinations of the colorants to cover the range of 0%-100% coverage for each colorant, e.g., all possible combinations of 3 or 4 coverage levels for each of the colorants.

In a step S2, the target is measured using the spectrophotometer both: (i) with the UV cutoff filter; and, (ii) without using the UV cutoff filter. The spectrophotometer data define a spectral reflectance distribution for each color patch of the multi-colorant target which defines the color patch in terms of the intensity of reflected light in each of a plurality of different wavelength ranges.

In a step S3, colorimetric CIEXYZ tristimulus values for each color patch of the CMYK target are calculated to derive a luminance value for each patch of the CMYK target. In particular, the difference between the measurements of a color patch of the CMYK target taken with and without the UV cutoff filter will approximate the spectral radiance $\hat{I}_{UV}$ of the color patch for UV light, i.e., the luminance of the color patch in UV light or the "UV luminance." This is represented by the model:

$$\hat{I}_{UV} = I_{VIS}(R_U - R_{UV}) \quad \text{(Eq. 2)}$$

where $I_{VIS}$ is the spectral power distribution of the spectrophotometer light source, $R_U$ is spectral reflectance without the UV cutoff filter, and $R_{UV}$ is the spectral reflectance with the UV cutoff filter. From (Eq. 2) the CIEXYZ tristimulus values for the UV spectral radiance $\hat{I}_{UV}$ of each color patch for UV light are easily computed using the CIE 1931 standard color matching functions x, y, z ($x_{bar}, y_{bar}, z_{bar}$), i.e., the spectral radiance $\hat{I}_{UV}$ of each color patch of the multi-colorant target is integrated using the CIE standard x, y, and z color matching functions.

Because the multi-colorant CMYK target includes a ramp of each colorant, but only a limited number of colorant combination color patches, in a step S4, the CIEXYZ tristimulus values calculated in step S3 and the known CMYK target values are used to derive an uncorrected UV characterization model UVM', e.g., the XYZ tristimulus values are interpolated to derive at least the Z tristimulus component for all possible arbitrary combinations of the CMYK colorants.

It is generally known in the art that, for visible light, the Y component of the XYZ tristimulus value system or color space represents the luminance of a color, while the X and Z components relate to chromacity. For visible light applications, the X and Z chrominance components cannot be used as a predictor for luminance. Given these known attributes for visible light, it would seem possible to use the Y component of each color patch of the CMYK target as a predictor or UV luminance for the color patch. For UV light, however, the Y component exhibits very little dynamic range and is, thus, susceptible to noise arising from (Eq. 2), making it unsuitable for use as a reliable predictor of UV luminance. According to the present development, it has been determined that the Z component of the XYZ tristimulus system, exhibits a much greater dynamic range in UV light and, in contrast to its visible light properties, is a predictor of luminance for UV light.

Although not optimal, in a step S5, the Z tristimulus component derived from steps S3 and S4 can be used "as-is," to predict UV luminance for any arbitrary combination of the CMYK colorants, i.e., the Z tristimulus values obtained from steps S3 and S4 are used to define the uncorrected UV printer characterization model UVM' and provide the luminance output L for all CMYK colorant mixtures M input to the model.

More preferably, in a step S6, a correction factor for the solid colors in the uncorrected model UVM' is derived based on the visual matching task described above or the like. In a step S7 correction factors for non-solid CMYK inputs are derived, and the correction factors are applied to the uncorrected UV printer characterization model UVM' to generate the corrected UV characterization model UVM. One suitable visual matching task is described above in relation to FIGS. 4A and 4B, wherein the actual human observed UV luminance for solid CMYK colorant patches and solid red, green and blue (RGB) overprints are used to correct the Z tristimulus values of the uncorrected UV printer characterization model UVM' to define the (corrected) UV printer characterization model UVM. In such case, a correction factor CF for the 100% colorant coverage level for each of the CMY colorants and the RGB overprints can be determined for each CMY colorant and each RGB overprint as follows:

$$CF = Z_K/Z \quad (Eq. 3)$$

where $Z_K$ is the Z tristimulus value corresponding to the digital black level selected by a user in the visual matching task, and Z is the uncorrected Z tristimulus value for the relevant colorant or overprint at 100% coverage. As noted above in connection with FIG. 3, once the correction factor CF is determined for the CMY and RGB 100% coverages, the correction factor for an arbitrary colorant coverage combination can be derived by interpolation, e.g., using the Neugebauer model or the like. This correction factor is then multiplied by the luminance originally predicted by the UV printer characterization model to produce a corrected prediction of UV luminance for the given colorant combination.

In a step S8, the corrected Z tristimulus values are used as the UV printer characterization model UVM to provide the luminance L for the various colorant mixtures M input to the model UVM, and the model UVM is applied to predict UV luminance for any arbitrary CMYK input colorant mixture M.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for predicting the appearance of a color print viewed under UV illumination, said method comprising the steps of:

using a multi-colorant digital printer to print a multi-colorant target comprising a plurality of color patches each printed using a known coverage of one or more of a plurality of printer colorants;

illuminating the target using a UV light source;

capturing an electronic image of the multi-colorant target while illuminated with the UV light source, wherein said electronic image comprises a plurality of color signals acquired for each color patch of said multi-colorant target;

using at least one of the plurality of color signals for each color patch to compute a prediction of luminance under UV light for each color patch of said multi-colorant target;

from the prediction of luminance under UV light for each color patch, deriving a UV printer characterization model that relates any arbitrary combination of said printer colorants to a predicted UV luminance, said predicted UV luminance for said combination of printer colorants indicating a relative luminance ordering resulting from printing a document using such combination of printer colorants and viewing the document while the document is illuminated with a UV light source;

correcting said UV printer characterization model based upon input received from human observers performing a visual matching task, wherein said visual matching task comprises:

printing a visual matching target comprising solid color regions including: (i) a 100% colorant coverage region for each of said printer colorants; and, (ii) a 100% colorant coverage overprint region for each two color combination of said printer colorants;

printing a plurality of black regions of respectively varying black colorant coverages adjacent to each of said solid color regions;

illuminating said visual matching target with a UV light source;

while said visual matching target is illuminated with said UV light source, and for each solid color region, receiving input from a human observer identifying one of said black regions that most closely matches the luminance of the solid color region;

for each solid color region, deriving a solid color correction factor based on the luminance predicted by the UV printer characterization model for the solid color region and the luminance predicted by the UV printer characterization model for the corresponding matching black region according to the equation:

$$CF = B_K/B$$

where CF is the correction factor, B is the luminance of the solid color region as predicted by the UV printer characterization model, and $B_K$ is the luminance of the corresponding matching black region as predicted by the UV printer characterization model;

for an arbitrary colorant coverage combination of said printer colorants in said UV printer characterization model, deriving an arbitrary coverage correction factor based upon the solid color correction factors, and;

applying the arbitrary coverage correction factor to obtain a corrected predicted luminance for the arbitrary colorant coverage combination in said UV printer characterization model by multiplying the arbitrary coverage correction factor derived for that colorant combination by the luminance predicted by the UV printer characterization model for that colorant combination.

2. The method as set forth in claim 1, wherein said step of capturing an electronic image comprises using a digital camera.

3. The method as set forth in claim 1, wherein said plurality of color signals comprise red, green and blue signals, and wherein said step of using at least one of the plurality of color signals for each color patch to compute a prediction of luminance under UV light for each color patch of said multi-colorant target comprises selecting the blue signal and using only said blue signal as a predictor of UV luminance.

4. The method as set forth in claim 1, wherein said multi-colorant target comprises:
   a single colorant ramp color patch for each of said plurality of printer colorants, wherein each colorant ramp comprises all possible single colorant coverage levels for a printer colorant;
   a plurality of colorant mixture color patches each defined by known coverage levels of two or more of said printer colorants.

5. The method as set forth in claim 1, wherein said step of deriving an arbitrary coverage correction factor comprises interpolating the solid color correction factors for the solid color regions that make up the arbitrary colorant coverage combination.

6. A method for predicting the appearance of a color print viewed under UV illumination, said method comprising the steps of:
   using a multi-colorant digital printer to print a multi-colorant target comprising a plurality of color patches each printed using a known coverage of one or more of a plurality of printer colorants;
   using a spectrophotometer without a UV cutoff filter to obtain a first spectral reflectance distribution for each color patch of said multi-colorant target;
   using the spectrophotometer with a UV cutoff filter to obtain a second spectral reflectance distribution for each color patch of said multi-colorant target;
   using said first and second spectral reflectance distributions to derive a prediction of the spectral radiance distribution under UV light for each color patch of said multi-colorant target;
   using the predicted spectral radiance distribution of each color patch to calculate predicted color appearance values for that color patch under UV light;
   from the prediction of color appearance values for each color patch, deriving a UV printer characterization model that relates any arbitrary combination of said printer colorants to a predicted UV color appearance value, said predicted UV color appearance value for the said combination of printer colorants indicating a relative color appearance resulting from printing a document using such combination of printer colorants and viewing the document while the document is illuminated with a UV light source;
   correcting the UV printer characterization model based upon input received from human observers performing a visual matching task, wherein said visual matching task comprises:
      printing a visual matching target comprising solid color regions including: (i) a 100% colorant coverage region for each of said printer colorants; and, (ii) a 100% colorant coverage overprint region for each two color combination of said printer colorants;
      printing a plurality of black regions of respectively varying black colorant coverages adjacent to each of said solid color regions;
      illuminating said visual matching target with a UV light source;
      while said visual matching target is illuminated with said UV light source, and for each solid color region, receiving input from a human observer identifying one of said black regions that most closely matches the luminance of the solid color region;
      for each solid color region, deriving a solid color correction factor based on the UV color appearance value predicted by the UV printer characterization model for the solid color region and the UV color appearance value predicted by the UV printer characterization model for the corresponding matching black region according to the equation:

$$CF = Z_k/Z$$

where CF is the correction factor, Z is the UV color appearance value of the solid color region as predicted by the UV printer characterization model, and $Z_k$ appearance value of the corresponding matching black region as predicted by the UV printer characterization model;
   for an arbitrary colorant coverage combination of said printer colorants in said UV printer characterization model, deriving an arbitrary coverage correction factor based upon the solid color correction factors; and,
   applying the arbitrary coverage correction factor to obtain a corrected predicted UV color appearance value for the arbitrary colorant coverage combination in said UV printer characterization model by multiplying the arbitrary coverage correction factor derived for that colorant combination by the UV color appearance value predicted by the UV printer characterization model for that colorant combination.

7. The method as set forth in claim 6, wherein said UV color appearance values for each color patch are approximated by luminance.

8. The method as set forth in claim 7, wherein CIE XYZ colorimetric coordinates are obtained from the predicted spectral radiance distribution, and the Z component is assigned as luminance.

9. The method as set forth in claim 6, wherein said step of deriving an arbitrary coverage correction factor for an arbitrary colorant coverage combination of said printer colorants comprises interpolating the solid color correction factors for the solid color regions that make up the arbitrary colorant coverage combination.

10. A method for predicting the appearance of a color print viewed under UV illumination, said method comprising the steps of:
   using a multi-colorant digital printer to print a multi-colorant target comprising a plurality of color patches each printed using a known coverage of one or more of a plurality of printer colorants;
   illuminating the target using a UV light source;
   capturing an electronic image of the multi-colorant target while illuminated with the UV light source, wherein said electronic image comprises a plurality of color signals acquired for each color patch of said multi-colorant target;

using at least one of the plurality of color signals for each color patch to compute a prediction of luminance under UV light for that color patch;

from the prediction of luminance under UV light for each color patch, deriving a UV printer characterization model that relates any arbitrary combination of said printer colorants to a predicted UV luminance, said predicted UV luminance for said combination of printer colorants indicating a relative luminance resulting from printing a document using such combination of printer colorants and viewing the document while the document is illuminated with a UV light source;

correcting said UV printer characterization model based upon input received from human observers performing a visual matching task, wherein said visual matching task comprises:

printing a visual matching target comprising solid color regions including: (i) a 100% colorant coverage region for each of said printer colorants; and, (ii) a 100% colorant coverage overprint region for each two color combination of said printer colorants;

printing a plurality of black regions of respectively varying black colorant coverages adjacent to each of said solid color regions;

illuminating said visual matching target with a UV light source;

while said visual matching target is illuminated with said UV light source, and for each solid color region, receiving input from a human observer identifying one of said black regions that most closely matches the luminance of the solid color region;

for each solid color region, deriving a solid color correction factor based on the luminance predicted by the UV printer characterization model for the solid color region and the luminance predicted by the UV printer characterization model for the corresponding matching black region according to the equation:

$$CF = Z_k/Z$$

where CF is the correction factor, Z is the luminance of the solid color region as predicted by the UV printer characterization model, and $Z_K$ is the luminance of the corresponding matching black region as predicted by the UV printer characterization model; and for an arbitrary colorant coverage combination of said printer colorants in said UV printer characterization model, deriving an arbitrary coverage correction factor based upon the solid color correction factors, and;

applying the arbitrary coverage correction factor to obtain a corrected predicted luminance for the arbitrary colorant coverage combination in said UV printer characterization model by multiplying the arbitrary coverage correction factor derived for that colorant combination by the luminance predicted by the UV printer characterization model for that colorant combination.

11. A method for predicting the appearance of a color print viewed under UV illumination, said method comprising the steps of:

using a multi-colorant digital printer to print a multi-colorant target comprising a plurality of color patches each printed using a known coverage of one or more of a plurality of printer colorants;

using a spectrophotometer without a UV cutoff filter to obtain a first spectral reflectance distribution for each color patch of said multi-colorant target;

using the spectrophotometer with a UV cutoff filter to obtain a second spectral reflectance distribution for each color patch of said multi-colorant target;

using said first and second spectral reflectance distributions to derive a prediction of the spectral radiance distribution under UV light for each color patch of said multi-colorant target;

using the predicted spectral radiance distribution of each color patch to calculate a predicted luminance value for that color patch under UV light;

from the predicted luminance value for each color patch, deriving a UV printer characterization model that relates any arbitrary combination of said printer colorants to a predicted UV luminance value, said predicted UV luminance value for the said combination of printer colorants indicating a relative luminance resulting from printing a document using such combination of printer colorants and viewing the document while the document is illuminated with a UV light source;

correcting the UV printer characterization model based upon input received from human observers performing a visual matching task, wherein said visual matching task comprises:

printing a visual matching target comprising solid color regions including: (i) a 100% colorant coverage region for each of said printer colorants; and, (ii) a 100% colorant coverage overprint region for each two color combination of said printer colorants;

printing a plurality of black regions of respectively varying black colorant coverages adjacent to each of said solid color regions;

illuminating said visual matching target with a UV light source;

while said visual matching target is illuminated with said UV light source, and for each solid color region, receiving input from a human observer identifying one of said black regions that most closely matches the luminance of the solid color region;

for each solid color region, deriving a solid color correction factor based on the luminance value predicted by the UV printer characterization model for the solid color region and the luminance value predicted by the UV printer characterization model for the corresponding matching black region according to the equation:

$$CF = Z_k/Z$$

where CF is the correction factor, Z is the luminance value of the solid color region as predicted by the UV printer characterization model, and $Z_K$ is the luminance value of the corresponding matching black region as predicted by the UV printer characterization model; and for an arbitrary colorant coverage combination of said printer colorants in said UV printer characterization model, deriving an arbitrary coverage correction factor based upon the solid color correction factors, and;

applying the arbitrary coverage correction factor to obtain a corrected predicted luminance value for the said arbitrary colorant coverage combination in said UV printer characterization model by multiplying the arbitrary coverage correction factor derived for that colorant combination by the luminance value predicted by the UV printer characterization model for that colorant combination.

\* \* \* \* \*